United States Patent [19]

Schatz et al.

[11] 4,036,779

[45] July 19, 1977

[54] METHOD OF REGENERATING CATALYST IN A SWIRL TYPE REGENERATOR CONTAINING A DILUTE PHASE BAFFLE

[75] Inventors: Klaus W. Schatz, Philadelphia, Pa.; Paul W. Snyder, Jr., Pitman, N.J.

[73] Assignee: Mobil Oil Corporation, New York, N.Y.

[21] Appl. No.: 734,223

[22] Filed: Oct. 20, 1976

[51] Int. Cl.² .................. B01J 21/20; B01J 29/38; C10G 11/18
[52] U.S. Cl. .................. 252/417; 23/288 B; 23/288 S; 208/120; 208/164
[58] Field of Search .................. 252/417; 208/120, 164; 23/288 B, 288 S

[56] References Cited

U.S. PATENT DOCUMENTS

| 3,846,280 | 11/1974 | Owen et al. | 252/417 |
| 3,904,548 | 9/1975 | Fagan et al. | 252/417 |

Primary Examiner—Winston A. Douglas
Assistant Examiner—P. E. Konopka
Attorney, Agent, or Firm—Charles A. Huggett; Raymond W. Barclay; Claude E. Setliff

[57] ABSTRACT

A regenerator design and method are provided which rely upon a segmented regeneration gas distributor grid to vary regeneration gas flow upwardly through the bed of catalyst above. The design includes an expanding annular section formed by a curved vertically extending baffle positioned adjacent and downstream of the catalyst tangential inlet and a radical dilute phase baffle extending from slightly beneath the bed surface to above the cyclone inlets. The width of the dilute phase baffle is from the wall of the regenerator to the center thereof, and beyond the rim of the catalyst outlet. Further, all cyclone diplegs between the outlet and inlet should be positioned to discharge tangentially to the swirl.

3 Claims, 2 Drawing Figures

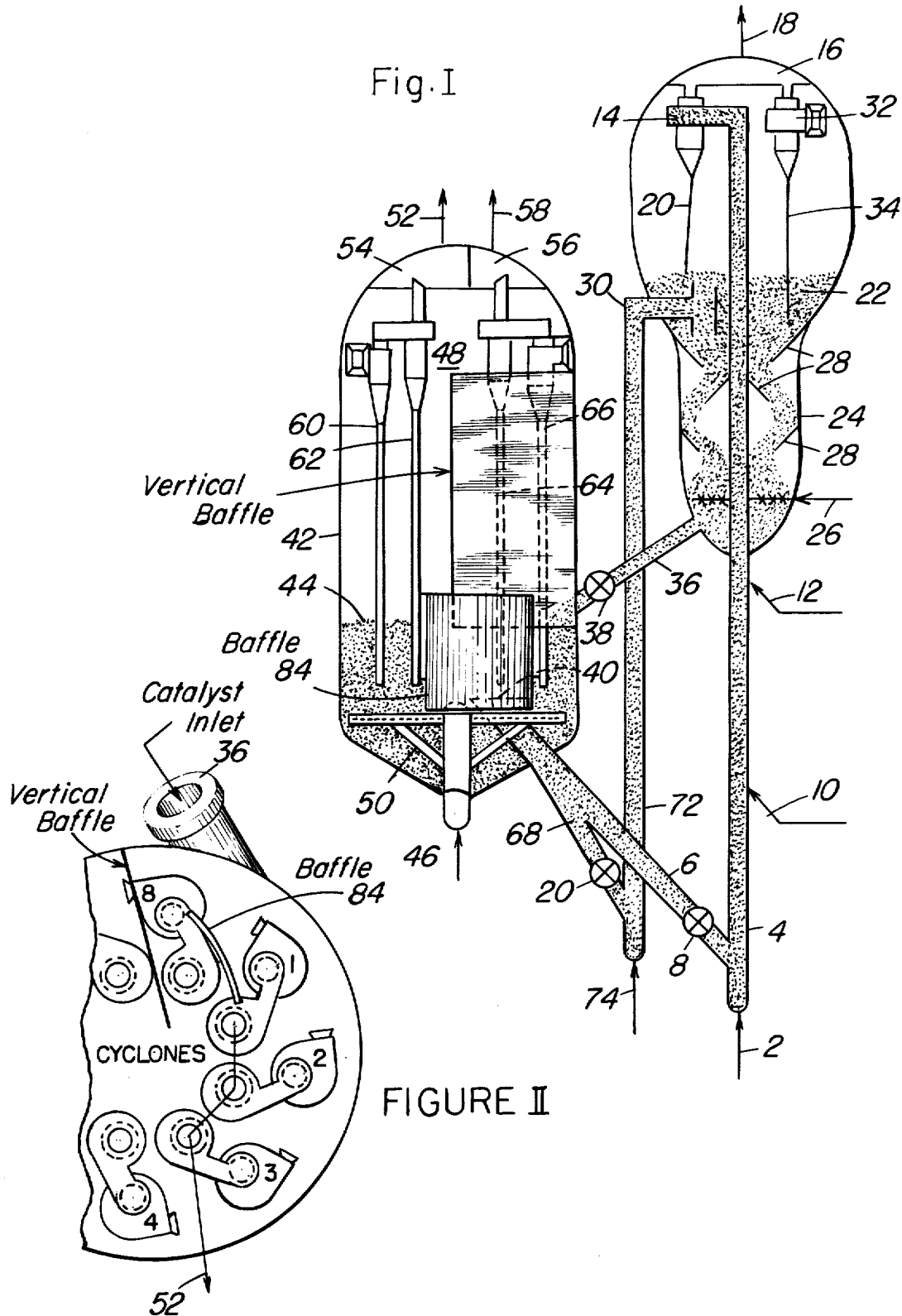

METHOD OF REGENERATING CATALYST IN A SWIRL TYPE REGENERATOR CONTAINING A DILUTE PHASE BAFFLE

BACKGROUND OF THE INVENTION

1. FIELD OF THE INVENTION

The invention relates to regeneration of catalyst in a swirl type regenerator. More particularly, it relates to such regeneration in a regenerator containing a combination of dense and dilute phase baffles.

2. DISCUSSION OF THE PRIOR ART

The technology of contacting finely divided solid particles with gaseous material to obtain conversion with the solid particles, extraction of the particles or the removal of deposited materials therefrom wherein the solids are maintained in a fluid phase condition are plagued with problems associated with obtaining a relatively uniform contact between supplied gaseous material and solid particle material. Thus in large fluid bed operations employed for the regeneration of catalyst particles, means for obtaining a desired distribution of regeneration gas throughout the regenerator cross section and catalyst bed to obtain a desired removal of carbonaceous deposits has been a source of constant investigation to obtain improved results. The problems of regenerating catalyst have been aggravated with the development of more active and selective cracking catalysts; that is, cracking catalysts that are more selective at high temperatures and of high or low coke producing characteristics. Furthermore, to take advantage of the catalyst potential for converting hydrocarbons, it is important to obtain a substantially complete uniform removal of deposited carbonaceous material before return thereof at an elevated hydrocarbon conversion temperature to the hydrocarbon conversion step. The present invention is concerned with the method and apparatus for distributing gaseous material to the bottom portion of a fluid bed of finely divided solid particle material to obtain regeneration thereof.

The use of dense phase baffles in regeneration methods is known. For example, U.S. Pat. No. 3,904,548 describes an operation of regenerating a catalyst which contains an annular baffle spaced inwardly from the outer wall of the regeneration zone.

SUMMARY OF THE INVENTION

In accordance with the invention, there is provided an improved hydrocarbon conversion catalyst regeneration operation in the presence of fluidizable catalyst particles comprising maintaining a fluid bed of catalyst particles circulating or swirling circumferentially in a regeneration zone, said bed comprising a dense phase and a dilute phase, said zone containing in the dense phase an annular section formed by a curved upwardly extending baffle spaced inwardly from the outer wall thereof, the improved method comprising
   introducing catalyst particles obtained from
   a hydrocarbon conversion operation after
   stripping thereof into said zone tangentially
   to said circulating bed of catalyst, the dilute phase of said zone having positioned therein a dilute phase baffle, extending from beneath the dense phase (about 1 foot) approximately to the cyclone inlet and from the outer wall of the regenerator inwardly to the center thereof,
   reversing the cyclone diplegs between the catalyst outlet and inlet so that catalyst therefrom discharges tangentially to the swirl,
   passing regeneration gas upwardly through the circulating fluidized particle in said regeneration zone,
   recovering gaseous products of regeneration from an upper portion of the regeneration zone, and
   withdrawing regenerated catalyst from a lower section of said fluid bed of catalyst.

DESCRIPTION OF SPECIFIC EMBODIMENTS

The present invention relates to the method and apparatus for contacting finely divided solid particle material with a gaseous material under selected operating conditions. In one aspect, the present invention is concerned with a method for improving the recovery and separation of compounds adsorbed on the catalyst during conversion of hydrocarbons. In another aspect the invention is concerned with the regeneration of finely divided solid catalyst particles in a swirl type catalyst regeneration zone to obtain removal of carbonaceous deposits by burning in the presence of an oxygen containing gaseous material. In the swirl type catalystregeneration system of the present invention, the solid catalyst particles are regenerated in a fluid catalyst bed operation varying in bed density and supplied with regeneration gas in the lower portion thereof by a plurality of radiating distributing grids or segments individually controlled with respect to the volume of regenerating gas passed through any given segment.

The plurality of horizontally radiating distributing grids positioned in the lower portion of the regeneration zone extend outwardly from a central vertically extending regeneration gas inlet conduit projecting upwardly into the bottom portion of the regeneration vessel. Each radiating grid segment is provided with a horizontally disposed regeneration gas distributing conduit from which a plurality of spaced apart distributing pipes extend at a right angle thereto to fill a triangular segment of the cross-sectional area of the regeneration vessel. In the arrangement herein provided and discussed, the cross-sectional area of the vessel is separated into six relatively equal triangular segments and each segment is provided with its own distributing grid with fluid flow control means as herein explained. In this arrangement, each grid segment is provided with a regenerating gas supply support conduit extending upwardly and outwardly from the main vertically disposed regeneration gas inlet conduit to the horizontally disposed distributing conduit and is open communication therebetween to permit the flow of regeneration gas therethrough. Thus the supply of regeneration gas to the outer portion of each distributing segment is augmented by the open end support conduit above identified. The regeneration gas distributing pipes closed at the outer end thereof are provided with a plurality of downwardly extending nozzles or orifice means throughout the length of the pipe on the bottom side thereof through which the regeneration gas is passed under selected pressure drop conditions restricted to within the range of 0.4 to 1.2 psi to minimize catalyst attrition and turbulence before flow upwardly through the bed of solids thereabove under fluidizing conditions.

In the arrangement of the present invention, each separate horizontal fluid distributing and supply conduit and each support conduit communicating therewith is provided with simple plate or butterfly valve means at the inlet of each conduit projecting from the substantial vertical gas inlet conduit projecting upwardly into the bottom portion of the vessel. The vertically aligned valve means associated with each distributing gas segment are controlled by a vertically extending rod means associated with the valves which are coupled to control means extending through the wall of the vertical gas feed conduit external to the vessel. Thus the valve means at each inlet may be simple butterfly valves or plates connected to the vertical rods and positioned with respect to the radiating conduit inlets to permit altering the flow of regeneration gas therethrough by partially or completely covering the inlet. Complete coverage of the inlet is not necessary. Also, flow of regeneration gas through distributing pipes provided with nozzle or orifice means is controlled by restricting the orifice size and in some cases limiting the number of available orifices.

In the regeneration of solid particle material, such as finely divided catalyst particles, it is known that temperatures within the range of 800° to 1400° F may be employed; it being preferred to regenerate catalyst for cracking operations at temperatures in excess of 1100° F. and usually at temperatures of less than 1,300° F. Furthermore, the regeneration operating pressure may be about atmospheric or considerably higher and up to about 100 or 200 psig. The regeneration of catalyst for cracking operations is often accomplished at atmospheric pressures or slightly higher pressures up to about 50 or 100 psig. In such an operation the velocity of the gaseous material passed upwardly through the fluid bed of solids may vary over a considerable range and is controlled to obtain a desired dispersion within the range of dense to a less dense suspended phase of solids in the upflowing gaseous material. Thus depending on the density of the fluid bed of solids desired in the regeneration zone, the gaseous material will be introduced to provide a velocity within the range of 0.5 up to 5, 10 or higher feet per second. More usually the velocity of the gaseous material such as oxygen containing regeneration gas used to remove carbonaceous deposits by burning is sufficient to maintain the solid particle materials varying in size from 10 micron size up to about 100 micron particle size as a fluid bed of solid in a suspended or dispersed phase condition resembling a boiling liquid. It may be a dense fluid catalyst bed operation in the range of 30 to 40 lbs/cu. ft. or a more dispersed catalyst phase operation generally less than 30 lbs/cu. ft. superimposed by an even more dispersed catalyst phase in the upper cyclone section of the regeneration zone.

The present invention is concerned with the method and system for contacting finely divided fluidizable catalyst particles comprising a crystalline zeolite with a gaseous hydrocarbon reactant material and with regeneration gas so that the efficiency of the operation is considerably improved. In a more particular aspect the invention is concerned with a method of improving the recovery of compounds deposited on the catalyst in the hydrocarbon phase and effecting regeneration of catalyst particles in a swirl type dense fluid catalyst bed regeneration operation.

In the method and system of the present invention, a crystalline zeolite hydrocarbon conversion catalyst comprising fluidizable catalyst particles and containing deactivating carbonaceous deposits due to high temperature conversion of a gas oil boiling range hydrocarbon feed at a temperature of at least 950° F is subjected to a stripping operation by countercurrent flow to provide upflowing stripping gas. The stripping gas and stripped products of hydrocarbon conversion are recovered from a dispersed phase of catalyst above the stripping zone by cyclonic means before being passed to a hydrocarbon product separation step downstream of the hydrocarbon conversion operation. The stripped catalyst at an elevated stripping temperature is then discharged without cooling thereof tangentially into an adjacent catalyst regeneration zone containing a dense fluid bed of catalyst. The tangentially introduced catalyst imparts a swirl, circular or circumferential flow to the catalyst particles being subjected to contact with oxygen containing regeneration gas under elevated temperature catalyst regeneration conditions. More particularly, the deactivated and stripped catalyst partially desorbed of strippable contaminants in a relatively high temperature stripping operation in the range of 900° F to 1,200° F is discharged tangentially into the regeneration zone in a section or upper portion thereof adjacent the upper interface of a fluid bed of catalyst. The stripped catalyst enters the regenerator tangentially to and preferably into an upper fluid phase of catalyst particles above a more relatively dense fluid bed phase of catalyst therebelow. Thus, by introducing the catalyst tangentially into the regeneration zone and above the most dense phase of catalyst, a circumferential contact of catalyst with regeneration gas is initiated and particularly promoted in the swirl type of catalyst rgeneration system. Regeneration gas is introduced by the segmented distributing grid in restricted amounts to substantially the entire bottom cross-sectional area of the swirling bed of catalyst for substantially vertical flow upwardly therethrough and removal from an upper portion of the regeneration zone after passing through cyclonic means.

The regeneration zone is provided in its upper portion above the dense fluid bed of catalyst with a plurality of cyclonic separation means comprising first and second cyclonic separator means for removing catalyst fines entrained with the flue gas.

In the herein described hydrocarbon conversion catalyst regeneration arrangement, it has been found desirable to employ a high temperature stripping operation of at least 1050° F since such an operation will retain a much larger portion of catalyst adsorbed sulfur compounds in the hydrocarbon side or phase of the operation than accomplished heretofore. Furthermore, the higher the temperature of the catalyst mixture passed to the regeneration zone from the stripping zone in combination with temperature adjusted regeneration gas will operate to rapidly initiate combustion of carbonaceous deposits and thus more completely and efficiently accomplish regeneration of the catalyst particles circulating in the swirl type regeneration zone.

Catalyst particles traversing the swirl pattern in the fluid catalyst bed also move to a lower portion of the catalyst bed counter-current to upflowing regeneration gas and to a withdrawal well positioned in the lower portion of the regeneration zone adjacent to the upper surface of the regeneration gas distributor grid. The regenerated catalyst withdrawn by the withdrawal well at an elevated temperature usually in excess of about 1200° F and comprising a low residual coke deposit thereon is transferred by a catalyst standpipe to the lower portion of a riser hydrocarbon conversion zone. Regenerated catalyst may also be passed to the catalyst stripping zone as above suggested thus completing the circulation of catalyst through the system.

It is preferred to operate the catalyst regeneration zone under conditions providing regenerated catalyst at a temperature of at least 1,250° F and preferably in the range of 1,350° F to 1,400° F for recycle as herein provided. Regeneration gas velocities are selected from within the range of 0.5 to about 3 or 5 ft/second, the selection being based on that required to obtain the regeneration operation above described.

The regeneration operation above described is preferably used with one or more riser hydrocarbon conversion zones adjacent thereto, which are provided with a plurality of spaced apart feed inlet conduits along the length of the riser. In this arrangement, it is contemplated introducing a low sulfur containing feed or a hydrotreated light gas oil to an initialed portion of a riser reactor and a higher sulfur containing feed or a recycle stream from the product fractionator to a downstream portion of the riser. Furthermore, the conversion level of the higher boiling feed may be restricted as a function of its sulfur level and/or its additive coke characteristics. Thus the residence time of the hydrocarbon feeds may be altered as desired within the limits provided by the riser conversion zones. It is also contemplated using as a feed to the riser conversion zone, coker light and heavy gas oils, heavy vacuum gas oils and hydrogenated cyclic oils which give up hydrogen during the conversion operation as well as hydrogenated virgin and coker stocks and combinations thereof.

BRIEF DESCRIPTION OF THE DRAWINGS

FIG. 1 diagrammatically represents in elevation a side-by-side arrangement of vessels comprising a riser hydrocarbon conversion zone, a catalyst stripping zone, a fluid bed catalyst regeneration zone, and conduit means for passing regenerated catalyst to said hydrocarbon conversion zone and said stripping zone. The regenerator plenum means is shown separated to permit the separate recovery of high and low sulfur containing flue gas as herein described.

FIG. 2 is a cross-sectional view of the inside of the regenerator, showing the positioning of the baffles.

Referring now to FIG. 1, a hydrocarbon feed 2 such as a gas oil boiling from about 600° F up to 1000° F is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F but more usually at least 1,000° F is thus formed in the lower portion of riser 4 to flow upwardly therethrough under hydrocarbon conversion conditions. The suspension initially formed in the riser may be retained during flow through the riser for a hydrocarbon residence time in the range of 1 to 10 seconds. Additional hydrocarbon feed material usually higher boiling than the gas oil feed introduced to the riser 4 at one or more spaced apart downstream feed injection points 10 and 12 for a hydrocarbon conversion residence time less than that employed for converting feed introduced by conduit 2. On the other hand, the gas oil feed may be separated so that a low boiling portion thereof or a hydrocarbon feed fraction of low aromatic index rating may be initially mixed with regenerated catalyst in the riser and a higher boiling fraction or higher aromatic index rated material introduced at one or more downstream feed unit points.

The hydrocarbon vapor-catalyst suspension formed in the riser reaction is passed upwardly through riser 4 under hydrocarbon conversion conditions of at least 900° F and more usually at least 1,000° F before discharge into one or more cyclonic separation zones about the riser discharge, represented by cyclone separator 14. There may be a plurality of such cyclone separator combinations comprising first and second cyclonic separator means attached to or spaced apart from the riser discharge for separating catalyst particles from hydrocarbon vapors. Separated hydrocarbon vapors are passed from separator 14 to a plenum chamber 16 for withdrawal therefrom by conduit 18. Hydrocarbon vapors and gaseous material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as a downwardly moving fluid bed of catalyst counter-current to rising gaseous material. The catalyst passes downwardly through a stripping zone 24 immediately therebelow and counter-current to rising stripping gas introduced to a lower portion thereof by conduit 26. Baffles 28 are provided in the stripping zone to improve the stripping operation.

The stripping operation of the present invention may be improved by the addition of hot regenerated catalyst thereto by transfer conduit 30 in an amount so that the bed of catalyst 22 provides a catalyst mixture at an elevated temperature of at least 1,000° F promoting the decomposition of compounds adsorbed on the catalyst. The catalyst is maintained in stripping zone 24 for a period of time sufficient to effect a high temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device or an open end T-connection may be fastened to the riser discharge which is not directly connectd to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gaseous materials comprising stripping gas hydrocarbon vapors and desorbed sulfur compounds are passed from the cyclonic separation means represented by separator 32 plenum chamber 16 for removal with hydrocarbon products of the cracking operation by conduit 18. Gaseous material comprising hydrocarbon vapors is passed by conduit 18 to a product fractionation step not shown.

Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in transfer conduit 36.

The catalyst regeneration operation of the present invention is referred to above as a swirl type of catalyst regeneration due to the fact that the catalyst bed tends to rotate or circumferentially circulate about the vessels vertical axis and this motion is promoted by the operating parameter herein discussed, by the vertical baffles and by the tangential spent catalyst inlet to the circulating catalyst bed. Thus the tangentially introduced catalyst at an elevated temperature is further mixed with hot regenerated catalyst or catalyst undergoing regeneration at an elevated temperature and is caused to move in a circular or swirl pattern about the regenerators vertical axis as it also moves generally downward to a catalyst withdrawal funnel adjacent the regeneration gas distributor grid. The catalyst withdrawal funnel is positioned adjacent a vertical section of the regenerator vessel lying between the catalyst tangential inlet and withdrawal funnel so that catalyst particles introduced to the regenerator will traverse substantially the circumference of the regenerator vessel before encountering withdrawal therefrom as above described. This catalyst movement is promoted by an annular section expanding in the direction of catalyst flow by about 20° and formed by a curved vertical baffle member 84 spaced from the regenerator wall and adjacent the catalyst tangential inlet 36. The annulus thus formed may be construed as an extension of the catalyst inlet which expands in the direction of catalyst flow and operates to promote the circumferential catalyst circulation. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. This phenomenon in cooperation with the baffle provided and process operating concepts permits a desired control on the regeneration operational including segregating flue gas products of high and low sulfur content when desired.

In a fluid catalytic cracking unit, the amount of air in a particular section of the bed is determined by a plugging pattern which sets the number of open, or unplugged, nozzles in that section. The section between outlet and inlet is heavily plugged, while the section past the inlet is nearly all open. Air passing through the bed entrains catalysts into the dilute phase and the cyclones. Since the cyclones take in about the same amount of air, the heavily plugged area draws on the open inlet area to supply air to its superpositioned cyclone. At the same time spent catalyst is entrained through the dilute phase counter-clockwise toward the cyclone next to the outlet.

The catalyst can also migrate countercurrently to the swirl by a vertical eddy in the dense bed. The air in the open grid section lifts more catalyst out of the bed than the air in the heavily plugged area. As a result, catalyst spills from the inlet area back toward the outlet. An undercurrent from the less aerated and therefore denser section to the more aerated and lighter section completes the eddy.

The regeneration operation of this invention is improved by providing a vertical flat plate baffle member 85 extending from about 1 foot below the top level of the dense bed to approximately the level of the cyclone inlet, as shown in the drawings. The baffle prevents catalyst spill back as described above and breaks the vertical eddy.

The catalyst tangentially introduced by conduit 36 causes the catalyst to circulate in a clockwise direction. As the bed of catalyst continues its circular motion some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of circulating suspended catalyst particles 44 in upflowing oxygen containing regeneration gas introduced to the lower portion thereof by conduit distributor means 46, the density of the mass of suspended catalyst particles may be varied as discussed above by the volume of regeneration gas used in any given segment or segments of the distributor grid. In the general case, the circulating suspended mass of catalyst particles 44 undergoing regeneration with oxygen containing gas to remove carbonaceous deposits by burning will be retained as a suspended mass of swirling catalyst particles varying in density in the direction of catalyst flow due to plugging of the grid as above discussed and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase of catalyst thereabove. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating mass of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto as discussed above. Thus, oxygen containing combustion gases after contact with catalyst in the regeneration zone are separated from entrained catalyst particles by the cyclonic means provided and vertically spaced thereabove. Catalyst particles separated from the flue gases passing through the cyclones are returned to the mass of catalyst therebelow by the plurality of provided catalyst diplegs, reserved so the catalyst therefrom can discharge tangentially to the swirl.

Regenereated catalyst withdrawn by funnel 40 is conveyed by standpipe 6 to the hydrocarbon conversion riser 4. Withdrawn regenerated catalyst is also conveyed by conduit 68 provided with flow control valve 70 to a riser transfer conduit 72 for transferring hot regenerated catalyst to the stripping step above described. Substantially any suitable gaseous material introduced by conduit 74 to the lower portion of riser 72 may be used for this purpose.

In the catalyst regeneration system of the present invention, it is contemplated employing a total catalyst recycle through the cyclone diplegs to the catalyst bed in the range of 1 to 2 volumes per volume of catalyst introduced from the stripping zone and a higher rate of catalyst circulation through one or more of the combinations of catalyst diplegs than the other diplegs is contemplated. For example, a higher rate of catalyst circulation may be imposed upon the cyclone system of cyclones 1, 2 and 3 than on the remaining cyclonic systems.

We claim:

1. An improved hydrocarbon conversion catalyst regeneration operation in the presence of fluidizable catalyst particles comprising maintaining a fluid bed of catalyst particles circulating circumferentially in a regeneration zone, said bed comprising a dense phase and a dilute phase, said zone containing in the dense phase an annular section formed by a curved upwardly extending baffle spaced inwardly from the outer wall thereof, the improved method comprising:

introducing catalyst particles obtained from a hydrocarbon conversion operation after stripping thereof into said zone tangentially to said circulating bed of catalyst, the dilute phase of said zone having positioned therein a dilute phase baffle, extending from beneath the dense phase to the cyclone inlet and from the outer wall of the regenerator inwardly to about the center thereof, passing regeneration gas upwardly through the circulating fluidized particles in said regeneration zone, recovering gaseous products of regeneration from an upper portion of the regeneration zone, and withdrawing regenerated catalyst from a lower section of said fluid bed of catalyst.

2. The method of claim 1 wherein the dilute phase baffle extends about 1 foot below the top of the fluidized bed.

3. The method of claim 1 wherein the cyclone displegs between the catalyst outlet and inlet are reversed so that catalyst therefrom discharges tangentially to the circumferential circulation.

* * * * *